United States Patent
Dodd et al.

(10) Patent No.: US 6,179,933 B1
(45) Date of Patent: Jan. 30, 2001

(54) SURFACE TREATMENT OF ROLLING ELEMENT BEARING STEEL

(75) Inventors: Andrew Dodd; Jeffery Kinder, both of Nottingham (GB)

(73) Assignee: NSK-RHP European Technology Co., Limited (GB)

( * ) Notice: Under 35 U.S.C. 154(b), the term of this patent shall be extended for 0 days.

(21) Appl. No.: 09/214,628

(22) PCT Filed: Jul. 3, 1997

(86) PCT No.: PCT/GB97/01799

§ 371 Date: May 17, 1999

§ 102(e) Date: May 17, 1999

(87) PCT Pub. No.: WO98/01597

PCT Pub. Date: Jan. 15, 1998

(30) Foreign Application Priority Data

Jul. 8, 1996 (GB) .................................................. 9614303

(51) Int. Cl.[7] .............................. C23C 8/36; C23C 8/26; C23C 8/50
(52) U.S. Cl. ........................... 148/222; 148/225; 148/230
(58) Field of Search .................................. 148/222, 225, 148/230

(56) References Cited

U.S. PATENT DOCUMENTS

| | | | | |
|---|---|---|---|---|
| 2,946,708 | * | 7/1960 | Berghaus et al. | 148/16.6 |
| 4,909,862 | * | 3/1990 | Tachikawa et al. | 148/20.3 |
| 5,240,514 | * | 8/1993 | Yasuura et al. | 148/222 |
| 5,658,394 | * | 8/1997 | Meroth | 148/222 |
| 5,851,313 | * | 12/1998 | Milam | 148/222 |
| 5,989,363 | * | 11/1999 | Georges | 148/222 |

FOREIGN PATENT DOCUMENTS 19 25 486   4/1970 (DE) .

OTHER PUBLICATIONS

T. Bell and Y. Sun; "Load Bearing Capacity of Plasma Nitrided Steel under Rolling–Sliding Contact"; Surface Engineering, vol. 6 No. 2, 1990; pp. 133–139.

Robert Bennett; The Plasma Nitriding of Tool and Bearing Steels; The Institute of Metals, London, The University of Aston; 1987, pp. 1–14; 111–150; and 199–245.

Robert Bennett; The Plasma Nitriding of Tool and Bearing Steels; The Institute of Metals, London, The University of Aston; Diss. Abstr. Int.; Mar., 1989; 49, pp. 271.

M. Weck et al.; "Plasma Intriding to Enhance Great Properties"; Metallurgia; Aug., 1984; pp. 328–332.

K. Yataka; Database WPI, Section Ch, Week 9524, Derwent Publications Ltd., London; Class M27, AN 95–229362 and JP 07 139 549 A, Nippon Shirikoroi Kogyo KK, May 30, 1995, see abstract.

V. Zaitsev et al.; "Formation of Coatings on Bearing Steel ShKh15 During Ion–Plasma Nitriding and Subsequent Quenching with Tempering"; Metal Science and Heat Treatment, vol. 32, No. 9/10, Sep. 1, 1990, pp. 650–655.

* cited by examiner

Primary Examiner—Daniel J. Jenkins
Assistant Examiner—Nicole Coy
(74) Attorney, Agent, or Firm—Samuels, Gauthier & Stevens

(57) ABSTRACT

Rolling-element bearing components made from high quality steel are subjected to ion nitriding in a plasma as a final step in the manufacturing process to produce a layer with a hardness around 800–1200 HV with a depth no more than 150 $\mu$m. By controlling the conditions no friable surface layer is created and no further steps need to be performed on the component.

7 Claims, No Drawings

SURFACE TREATMENT OF ROLLING ELEMENT BEARING STEEL

FIELD OF THE INVENTION

The present invention relates in general to a process of manufacturing a rolling element bearing component and more particularly to a final surface treatment of the bearing component.

BACKGROUND

It is well known to subject steels to thermo-chemical treatments to create a hardened surface layer or case. Such treatments can involve several heating cycles to achieve the desired properties and post-machining is often necessary to compensate for dimensional changes and unwanted surface features. It is also known to subject steel to ion nitriding but in the case of conventionally nitrided bearing components additional steps are needed after nitriding to remove the friable compound layer which forms on the surface.

SUMMARY OF THE INVENTION

The present invention relates in general to a process applied to rolling element bearing components made in pre-hardened steel in the fully machined condition.

Rolling element bearing components for use in aircraft engines in particular are made from M50, M50 NiL, RBD and Pyrowear 675 steels. It has now been found that such components can exhibit superior properties if, as a final step in the manufacturing process, the component is subjected to a plasma (ion) nitriding treatment designed to increase the hardness of the outer surface to between 800 to 1200 HV0.3 up to a depth of 150 μm and the surface case is devoid of any compound layer.

The nitriding treatment can involve exposing the component to a plasma established by subjecting a gaseous atmosphere, principally composed of $N_2$ and preferably $N_2$ and $H_2$ to electrical energy and maintaining the exposure at a temperature in the range of 375° C. to 592° C. By careful control of the plasma (ion) nitriding conditions the formation of a compound layer is prevented and the distortion minimised thereby negating the need for subsequent machining.

DESCRIPTION OF PREFERRED EMBODIMENT

Bearing components made from M50, M50 NiL, RBD and Pyrowear 675 steels were subjected to the normal final machining operations, typically grinding and honing and then placed in a furnace containing a gaseous atmosphere composed of $N_2$ and $H_2$ in a ratio 2% $N_2$ and 98% $H_2$ at a pressure of 1 to 10 more preferably 1 to 3 torr. The gaseous atmosphere is converted into a plasma by supplying electrical energy. The electrical energy an be a.c. or d.c. or pulses of d.c. and additional heating energy can be supplied to the furnace to ensure the temperature of the plasma is in the range of 375° C. to 592° C. and preferably 460° C. for 1 to 2 hours. The ion nitriding process parameters (temperature, duration, pressure and atmosphere) can be adjusted according to the properties of the nitrided layer required.

After removal from the furnace the components each had a hardened surface devoid of any "white" compound layer. The maximum hardness of the surface layer was tested and found to be 1200 HV0.3 but more typically between 850 to 1000 HV0.3. If the depth of the surface layer is too large the components are prone to change in dimensions during plasma nitriding. For this reason the thickness of hardened surface layer should not exceed 150 μm with a preferred range of 50 μm to 100 μm.

Subsequent trials of the bearings components showed they exhibited improved wear resistance (particularly resistance to scuffing), resistance to debris damage, and rolling contact fatigue resistance. The improvement in rolling contact fatigue resistance ranged from over 4 times for M50 NiL to 12 times for M50.

The dimensions of the components do not suffer as a result of plasma nitriding and subsequent exposure to service conditions.

The following tables provides an example of properties of bearing components made from M50 NiL when subjected to the aforementioned plasma nitriding treatment.

| Depth of hardened surface layer (μm) | Surface Hardness HV0.3 | Dimensional change (significant x insignificant -) | Improvement in rolling contact fatigue resistace |
| --- | --- | --- | --- |
| Untreated | 700–750 | – | x1 |
| 25 | 850–900 | – | x3 |
| 50 | 900–960 | – | x4 |
| 75 | 940–1000 | – | x4 |
| 100 | 1000–1150 | – | x5 |
| 150 | 1100–1250 | x | x5 |
| 200 | 1100–1250 | x | x4 |

What is claimed is:

1. A process of manufacturing a rolling-element bearing component from pre-hardened steel, wherein as a final step in the manufacturing process the component is subjected to a plasma (ion) nitriding treatment by exposing the component to plasma created by subjecting a gaseous atmosphere of substantially 2% $N_2$ and 98% $H_2$ to electrical energy for a short time duration of about 1 to 2 hours, thereby to create a hardened outer surface case which is devoid of any compound layer, the outer surface case having a hardness of 800 to 1200 HV0.3 and extending up to a depth of 150 μm.

2. A process of manufacturing a rolling-element bearing component from pre-hardened steel, selected from the group comprising M50, M50 Nil, RBD and Pyrowear 675, wherein as a final step in the manufacturing process the component is subjected to a plasma (ion) nitriding treatment by exposing the component to plasma created by subjecting a gaseous atmosphere of about 2% $N_2$ and 98% $H_2$ to electrical energy for a short time duration in the order of 2 hours, thereby to create a hardened outer surface case which is devoid of any compound layer, the outer surface case having a hardness of 800 to 1200 HV0.3 and extending up to a depth of 150 μm.

3. A process of manufacturing a rolling-element bearing component from pre-hardened steel, selected from the group comprising M50, M50 Nil, RBD and Pyrowear 675, wherein as a final step in the manufacturing process the component is subjected to a plasma (ion) nitriding treatment by exposing the component to plasma created by subjecting a gaseous atmosphere of substantially 2% $N_2$ and 98% $H_2$ to electrical energy for a short time duration, for about 1 to 2 hours, thereby to create a hardened outer surface case which is devoid of any compound layer, the outer surface case having a hardness of 800 to 1200 HV0.3 and extending up to a depth of 150 μm.

4. A process according to claim 1, wherein the temperature of the plasma is maintained in the range 375° C. to 592° C. during the treatment.

5. A process according to claim 4, wherein the temperature is maintained by supplying additional energy.

6. A process according to claim 1, wherein the pressure of the gaseous atmosphere is between 1 and 10 torr.

7. A process according to claim 1, wherein the pressure of the gaseous atmosphere is between 1 and 3 torr.

* * * * *